United States Patent [19]

Richter

[11] 4,308,479
[45] Dec. 29, 1981

[54] MAGNET ARRANGEMENT FOR AXIAL FLUX FOCUSSING FOR TWO-POLE PERMANENT MAGNET A.C. MACHINES

[75] Inventor: Eike Richter, Scotia, N.Y.

[73] Assignee: General Electric Company, Schenectady, N.Y.

[21] Appl. No.: 182,130

[22] Filed: Aug. 28, 1980

[51] Int. Cl.³ .............................................. H02K 1/22
[52] U.S. Cl. ................................ 310/154; 310/68 R; 310/156
[58] Field of Search ..................... 310/68 R, 154, 156, 310/256, 258, 152, DIG. 5, 264, 268

[56] References Cited

U.S. PATENT DOCUMENTS

| | | |
|---|---|---|
| 3,334,254 | 8/1965 | Kober .................................. 310/156 |
| 3,836,802 | 9/1974 | Parker ................................. 310/154 |
| 3,906,268 | 9/1975 | de Graffenried .................... 310/154 |
| 4,011,475 | 3/1977 | Schmider .......................... 310/68 R |
| 4,104,787 | 8/1978 | Jandeska et al. ....................... 29/596 |
| 4,216,400 | 8/1980 | Lynch et al. ......................... 310/154 |

FOREIGN PATENT DOCUMENTS 1176550 1/1970 United Kingdom .
1437348 5/1976 United Kingdom .

OTHER PUBLICATIONS

Binns, K. J. et al., "Permanent-Magnet A.C. Generators" Proc. IEE, vol. 126, No. 7, Jul. 1979, pp. 690–696.

Richter, E., "Rare Earth Cobalt Permanent Magnets for Electrical Machines of Medium to Large Power Ratings", General Electric Corporate Research and Development Center, Report No. 79CRD012, Feb. 1979.

Marshall, R. A., et al., "Conceptual Study of Permanent Magnet Machine Ship Propulsion Systems", Final Report to Office of Naval Research, Material Sciences Division, Report No. SRD-77-170, Dec. 1977.

Richter, E., et al., "Conceptual Designs and Parametric Analysis of Permanent Magnet Machinery", Final Report to Naval Ship Research and Development Center on Contract No. N00167-79-C-0242, Mar. 1980.

Primary Examiner—J. D. Miller
Assistant Examiner—Donald L. Rebsch
Attorney, Agent, or Firm—William H. Steinberg; James C. Davis, Jr.; Marvin Snyder

[57] ABSTRACT

A two-pole permanent magnet A.C. machine employs one set of permanent magnets disposed with their magnetic axes parallel to the axis of rotation of the rotor and a second set of permanent magnets disposed so that their magnetic axes are oriented radially. This arrangement allows for significant reduction in flux leakage from the machine rotor and an increase in the power density of the machine.

10 Claims, 6 Drawing Figures

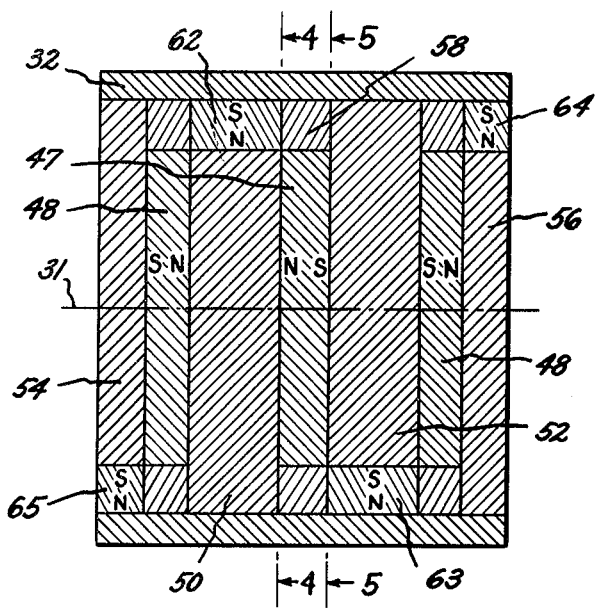
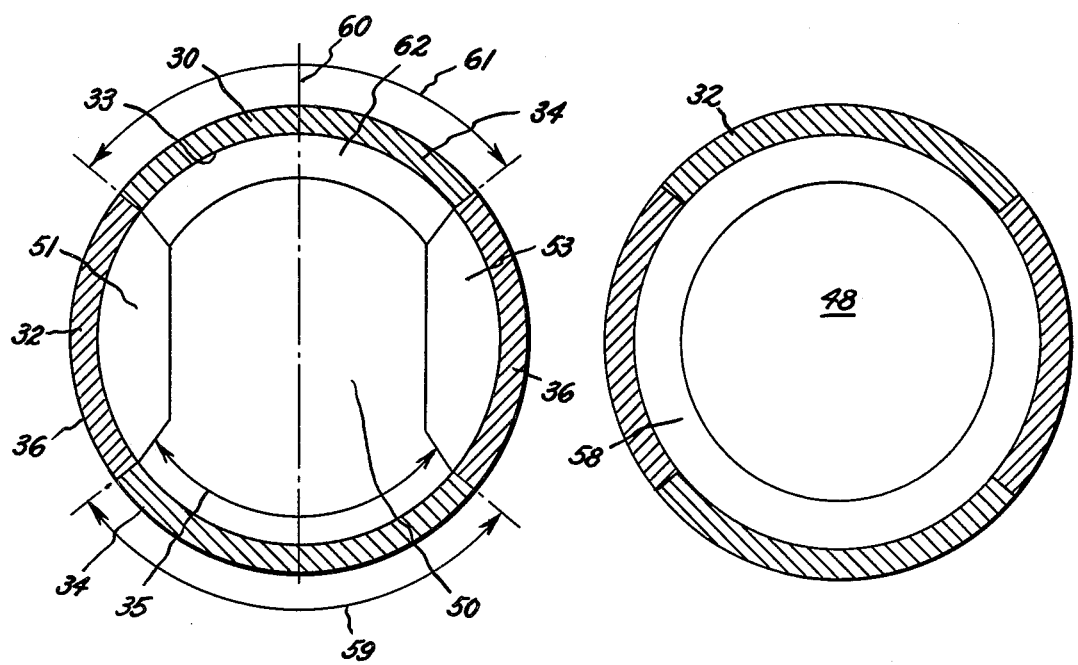

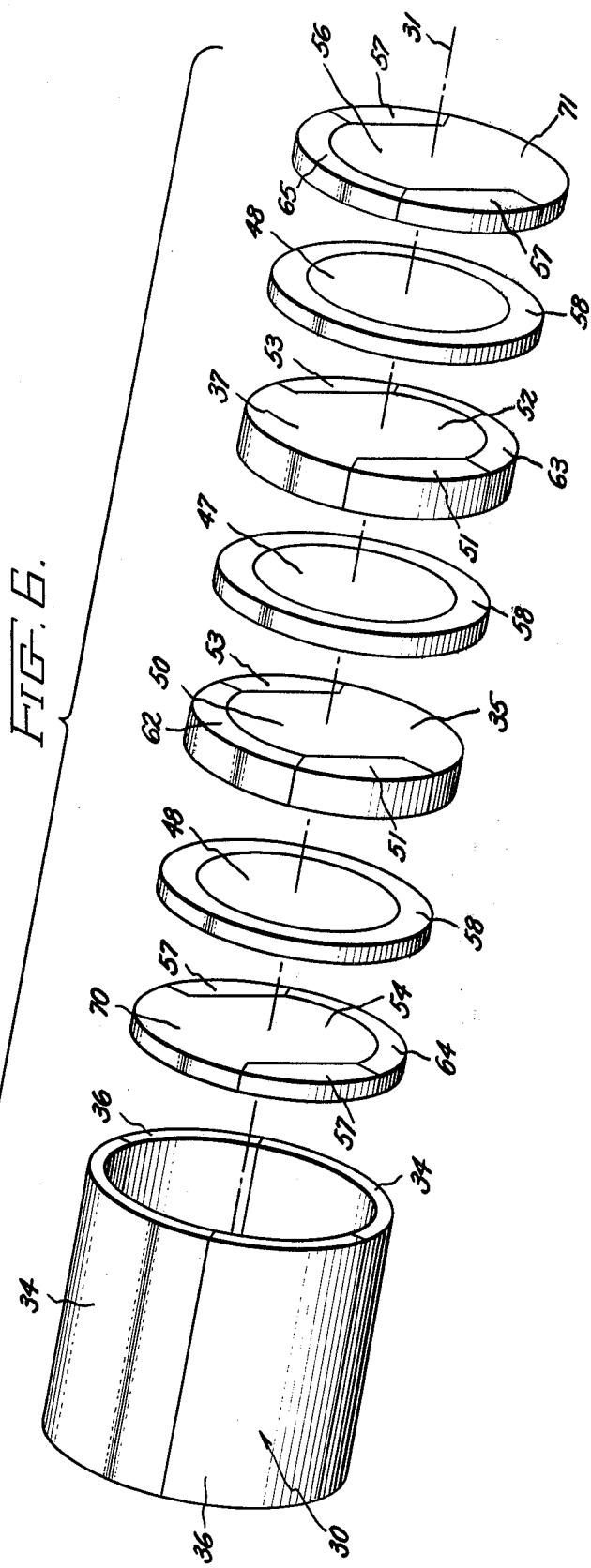

MAGNET ARRANGEMENT FOR AXIAL FLUX FOCUSSING FOR TWO-POLE PERMANENT MAGNET A.C. MACHINES

BACKGROUND OF THE INVENTION

The instant invention relates to permanent magnet A.C. machines, and, more particularly, to such machines having a two-pole configuration.

Rare earth cobalt magnets, as they are presently available, provide flux densities at the maximum energy point of around 0.4 to 0.6 Tesla. Since the maximum energy point also represents the lowest magnet volume for the magnetic energy required, one would like to operate the magnets close to the maximum energy point for maximum magnet utilization. In conventional magnet arrangements for two-pole permanent magnet machines, maximum magnet utilization results in a maximum achievable flux density in the annular air-gap surrounding a cylindrical rotor of less than 57% of the operating flux density of the permanent magnets. The precise percentage of maximum achievable flux density in the air-gap would depend entirely upon how much leakage flux exists in the rotor construction. The resulting low flux density in the air-gap requires a large machine for a given output power requirement, making the machine noncompetitive with wirewound machines, with respect to material utilization and machine efficiency, because the large machine volume required for a given power output more than compensates for the low loss densities achievable with permanent magnet machines.

Two representative prior art permanent magnet machines are described in British Pat. Nos. 1,176,550 and 1,437,348. Pat. No. 1,176,550 illustrates a machine in which nonmagnetic material is used to plug the spaces between magnets and pole pieces. Pat. No. 1,437,348 discloses a machine in which magnetic discs connect magnets and pole pieces. Each of these configurations experiences considerable leakage of magnetic flux, significantly reducing machine output from the theoretical maximum for a fixed magnet volume.

SUMMARY OF THE INVENTION

An object of the instant invention is to provide a two-pole construction for a permanent magnet machine which allows for placing of more magnet cross-sectional area into the two-pole rotor than is possible in the prior art arrangements. Another object of the instant invention is to provide a rotor construction which will achieve a significantly improved air-gap flux density for a given machine size.

The rotor construction of the instant invention includes a two-pole arrangement of the permanent magnets in the rotor to have a first set of permanent magnets so aligned that the magnetic axes of the magnets are parallel to the axis of rotation of the rotor, and a second set of magnets so aligned that the magnetic axes of the magnets of the second set are oriented radially with respect to the axis of rotation of the rotor. Further, the second set of magnets is so positioned that leakage flux from the magnets of the first set is essentially eliminated.

BRIEF DESCRIPTION OF THE DRAWINGS

The features of the invention believed to be novel and unobvious over the prior art are set forth with particularity in the appended claims. The invention itself, however, as to organization, method of operation and advantages thereof, may best be understood by reference to the following description taken in conjunction with the accompanying drawings in which:

FIG. 3 is a schematic partial cross-sectional view of a rotor built according to the instant invention;

FIG. 4 is a schematic partial cross-sectional view of the rotor of FIG. 3 taken along line 4—4 thereof;

FIG. 5 is a schematic partial cross-sectional view of the rotor of FIG. 3 taken along line 3—3 thereof; and FIG. 6 is a partial schematic exploded pictorial view of a rotor designed according to the instant invention.

DESCRIPTION OF THE PREFERRED EMBODIMENTS

Figure 1:
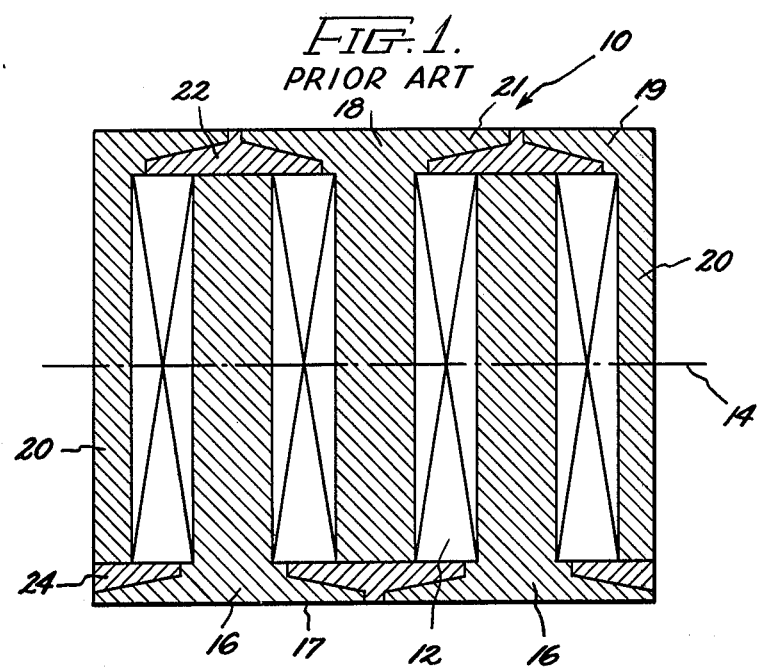
FIG. 1 is a schematic partial cross-sectional view of a prior art two-pole permanent magnet machine rotor.
Figure 2:
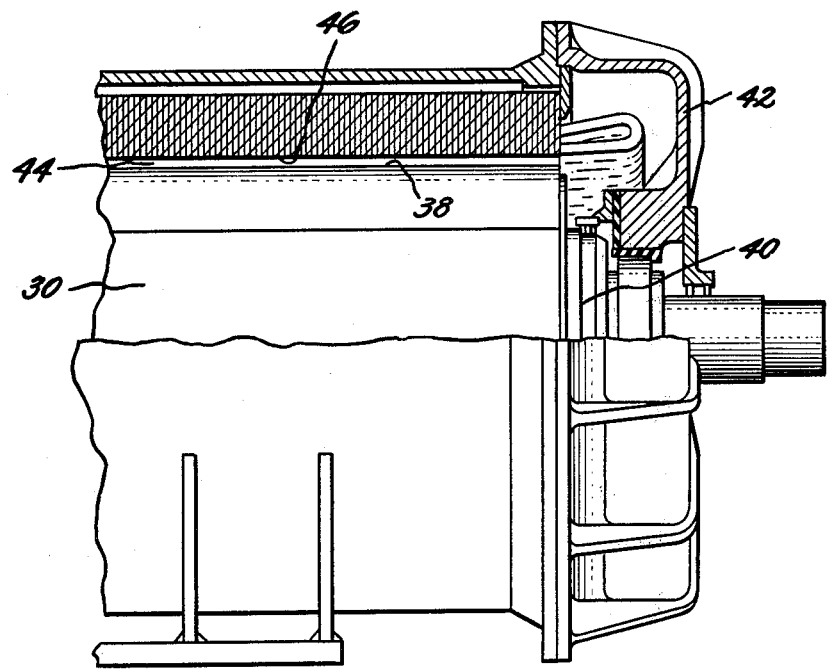
FIG. 2 is a schematic partial view partially in cross section of a machine built according to the instant invention.

The specific features of the instant invention described herein and shown in FIGS. 1–6 are merely exemplary, and the scope of the invention is defined in the appended claims. Throughout the description and FIGS. 1–6, like reference characters refer to like elements of the invention.

The conventional magnet arrangement for two-pole permanent magnet rotors 10 as shown in FIG. 1 employed circular permanent magnets 12 having their axes of magnetization in a plane parallel to the axis of rotation 14 of the rotor. The construction employs a plurality of circular permanent magnets 12 disposed in spaced relationship along the axis of rotation 14 of the rotor. Flux collectors 16 and 18 separate adjacent ones of magnets 12. Flux collectors 16, 18 and end collectors 20 of magnetic material, usually soft magnetic iron, direct the magnetic flux toward an annular air-gap separating the rotor outer surface from the inner surface of the machine stator. End collectors 20 have arcuate shoulders 19 thereon and collector 18 has a pair of arcuate shoulders 21 thereon which extend circumferentially over a certain portion of the rotor circumference. Shoulders 19 and 21 together form one pole of the rotor. Shoulders 17 on flux collectors 16 form the other pole of the machine disposed diametrically opposite the first pole. The poles are of limited circumferential extent, usually not more than 90°. Segments 22, 24 of nonmagnetic material, such as a nonmagnetic steel, are employed to hold the permanent magnets 12 in position between the magnetic pole pieces. A significant portion of the magnetic flux entering the flux collectors 16, 18 and 20 escapes from the air-gap as leakage flux, through the non-magnetic segments 22, 24 and at the ends of the pole pieces, so that the maximum achievable flux density in the air-gap is 57% or less of the operating flux density of the permanent magnets. For this reason, two-pole permanent magnet machines have been considered unsatisfactory configurations for permanent magnet rotors.

FIGS. 2–6 illustrate schematically a preferred embodiment of a two-pole rotor 30 including permanent magnets according to my instant invention. The rotor 30 is mounted by a pair of end members 40, one of which is shown, supported by suitable journal and thrust bearings within a machine housing 42 to be rotatable about axis of rotation 31 and to maintain a cylindrical air-gap 44 between the rotor outer surface 38 and the stator inner surface 46. The end members are attached, for example by bolting, to the axially-outer members of the cylindrical rotor 30.

Rotor 30 employs a plurality of disc-shaped high coercive-force permanent magnets 47, 48, FIG. 3, of the rare earth-cobalt (e.g., samarium-cobalt) type. The permanent magnets 47, 48 are surrounded by annular nonmagnetic spacers 58 and retaining ring 32, FIG. 5. The cylindrical outer retaining ring 32 comprises alternate arcuate segments 34, 36 of magnetic and nonmagnetic material, respectively, bonded (e.g., welded) together to form smooth outer surface 38 of the rotor 30.

Disposed axially between adjacent magnets are flux collectors 50, 52 of soft magnetic material, usually iron or an iron alloy. At the axial ends of the rotor are flux collectors 54, 56 of soft magnetic material, usually iron or an alloy thereof. Flux collector 50 includes an arcuate projection 35, which extends to the inner surface 33 of retaining ring 32 at one pole 59. Flux collector 50 is spaced from retaining ring 32 at pole 61 by an arcuate permanent magnet 62 oriented so that its axis of magnetization lies in a plane perpendicular to axis of rotation 31 and polarized so that the north pole of magnet 62 is adjacent flux collector 50. Flux collector 52 includes an arcuate projection 37, which extends to the inner surface 33 of retaining ring 32 at pole 61. Flux collector 52 is spaced from retaining ring 32 at pole 59 by an arcuate permanent magnet 63 oriented so that its axis of magnetization lies in a plane perpendicular to the axis of rotation 31 and polarized so that the south pole of magnet 63 is adjacent flux collector 52. Flux collectors 50, 52 are separated from the retaining ring 32 at positions centered about 90 mechanical degrees from the pole axis 60 by nonmagnetic spacers 51, 53. While only one each of flux collectors 50, 52 is shown, a plurality of similar flux collectors arranged in axial alternating sequence could be used with additional permanent magnets disposed between axially adjacent flux collectors. The axially outermost flux collectors 54, 56 have arcuate projections 70, 71, respectively, which extend to the inner surface 33 of retaining ring 32. Permanent magnets 64, 65 are disposed between the flux collectors 54, 56, respectively, and the inner surface 33 of retaining ring 32 at the respective poles 59, 61. Flux collectors 54, 56 are separated from retaining ring 32 at positions centered about 90 mechanical degrees from the pole axis by nonmagnetic spacers 57. The poles 59, 61 extend about 90 mechanical degrees centered at pole axis 60. The poles could have a greater or lesser circumferential extent, but approximately 90° is preferred.

FIG. 6 shows an exploded view of the rotor 30 of the instant invention. The circular disc magnets 47, 48 are magnetized to have opposed poles. The annular nonmagnetic spacers 58 have approximately the same radial extent as the arcuate magnets 62, 63, 64 and 65. Arcuate magnets 62 and 64 are magnetized, such that the combined magnetic flux of magnets 62, 64 adjacent each of the flux collectors 50, 56, respectively, contributes positively to the magnetic flux density in the air-gap immediately adjacent the radially outer surface of the pole 61. Arcuate magnets 63, 65 are magnetized, such that the combined magnetic flux of magnets 63, 65 adjacent each of the flux collectors 52, 55, respectively, contributes positively to the magnetic flux density in the airgap immediately adjacent the radially outer surface of pole 59. This arrangement results in each of the flux collectors 50, 52 being surrounded by opposed permanent magnets, FIG. 3, which enables arcuate magnets 62, 63, 64, 65 to prevent flux leakage from the flux collectors 50 to pole 61 and from flux collector 52 to pole 59. The retaining ring 32 is brazed into a single unit which supports the magnetic structure of the cylindrical rotor. The retaining ring 32 could carry additional amortisseur windings if required by the particular machine application.

In operation, the stack of magnets 47, 48 oriented to have the magnetization axis parallel to the axis of rotation generate the primary magnetic flux for operating the machine. The preferred material for each of the permanent magnets is high coercive-force samarium-cobalt. Neighboring magnets are arranged to oppose each other, as shown in FIG. 3, and feed flux into the flux collectors, which guide the flux radially-outward to the rotor poles 59, 61. The radially-oriented magnets 62, 63, 64 and 65 prevent magnetic flux from leaking from the pole to the flux collector of the opposite polarity thereby causing all the flux produced by magnets 47, 48 to contribute to the useful flux crossing the air-gap. The radially-oriented magnets may also be selected to contribute magnetic flux to the total rotor flux, if extra magnetic flux density is desired. These design considerations determine the size and material of the radially-oriented magnets.

A certain magnet operating point is established by a certain ratio of magnet length in the direction of magnetization to magnet cross-sectional area perpendicular to the direction of magnetization. For example, the ratio of axial length of magnet 47 to the circular cross-sectional area perpendicular to the axis of rotation establishes the operating point of magnet 47. Similarly, the ratio of the radial dimension of a respective one of arcuate magnets 62, 63, 64, 65 to the cross-sectional area of the magnet in the direction perpendicular to the direction of magnetization of the magnet establishes the operating point for the magnet. If the operating points of the arcuate magnets are selected to be above the value necessary for the prevention of any flux leakage through the magnets 62, 63, 64, 65, then these arcuate magnets contribute useful flux to the total magnetic flux crossing from the poles 59, 61 to the stator surface 46, i.e., crossing the air-gap 44.

The instant invention allows the achievement of flux focussing, which can provide a flux squeezing factor of greater than 2. It is therefore possible to achieve air-gap flux densities of 0.8 to 1.0 Tesla with magnet operating flux densities of 0.4 to 0.6 Tesla for the disk magnets 47, 48. This construction of the permanent magnet rotor is capable of providing the same power density in the air-gap as presently is achieved only with electrical excitation of rotor windings. Therefore, it will be apparent to those skilled in the art that my instant invention provides a structural magnet arrangement enabling the use of the two-pole configuration for permanent magnet machines, without the high magnetic flux leakage previously experienced with such a permanent magnet construction. Therefore, the advantages of permanent magnet machine construction, e.g., no electrical connections to the rotor, solid rotor construction, etc., may be obtained in a two-pole configuration.

I claim:

1. A two-pole permanent magnet A.C. machine comprising:
 a stator;
 a rotor, rotatable relative to said stator about a longitudinal axis thereof, and separated from said stator by a circumferential air-gap; said rotor comprising:

a plurality of disc-shaped permanent magnets oriented such that the axis of magnetization of each of said permanent magnets is parallel to the axis of rotation of said rotor; said disc-shaped permanent magnets being disposed concentrically about said axis and in axially spaced relationship;

a plurality of annular spacers of nonmagnetic material surrounding, respectively, each of said permanent magnets;

a plurality of magnetic flux collectors interleaved with said plurality of discshaped permanent magnets; alternate ones of said flux collectors having arcuate projections extending radially outward to form a pole of said rotor and the others of said flux collectors having arcuate projections extending radially outward to form the other pole of said rotor, said poles being centered 180° apart;

a plurality of arcuate permanent magnets disposed in axial alignment with and radially adjacent respective ones of said flux collectors and diametrically opposite said respective projections; and a retaining ring surrounding said annular spacers, said projections of said flux collectors and said arcuate permanent magnets; said retaining ring comprising alternate arcuate segments of magnetic and nonmagnetic material bonded into a unitary retaining ring.

2. The apparatus of claim 1 further comprising a pair of nonmagnetic segments one disposed adjacent each of said flux collectors and between said projection and the one of said arcuate magnets disposed adjacent each respective flux collector.

3. The apparatus of claim 2 wherein each of said disc-shaped magnets and each of said arcuate magnets is polarized such that the same polarity of magnetization surrounds each of said flux collectors.

4. The apparatus of claim 3 wherein said disc-shaped permanent magnets comprise high coercive-force rare earth cobalt magnets.

5. The apparatus of claim 4 wherein said arcuate permanent magnets comprise high coercive-force rare earth cobalt magnets.

6. The apparatus of claim 5 wherein each of said discshaped permanent magnets comprise samarium-cobalt magnets; and wherein said arcuate permanent magnets comprise samarium-cobalt magnets.

7. The apparatus of claim 1 wherein each of said magnetic segments of said retaining ring is disposed in circumferential alignment with the arcuate projections and arcuate magnets of one of said poles, and each of said nonmagnetic segments is disposed in circumferential alignment with one of each pair of said nonmagnetic segments.

8. The apparatus of claim 1 wherein said flux collectors comprise soft magnetic iron and said annular spacers and said arcuate permanent magnets have the same radial dimension.

9. The apparatus of claim 1 wherein said arcuate magnets are sized to have an operating point such that magnetic leakage flux from one of said flux collectors to the one of said poles of opposite polarity is prevented.

10. The apparatus of claim 1 wherein said arcuate magnets are sized to have an operating point such that said arcuate magnets contribute useful flux to said poles and flux collectors.

* * * * *